(12) United States Patent
Iguchi et al.

(10) Patent No.: US 8,784,645 B2
(45) Date of Patent: Jul. 22, 2014

(54) PROCESS FOR PRODUCING HYDROCARBON OIL

(75) Inventors: Yasutoshi Iguchi, Yokohama (JP); Tatsuo Hamamatsu, Yokohama (JP); Hideki Ono, Yokohama (JP); Akira Koyama, Yokohama (JP); Hideshi Iki, Yokohama (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 532 days.

(21) Appl. No.: 13/119,333

(22) PCT Filed: Sep. 16, 2009

(86) PCT No.: PCT/JP2009/066164
§ 371 (c)(1),
(2), (4) Date: May 13, 2011

(87) PCT Pub. No.: WO2010/032752
PCT Pub. Date: Mar. 25, 2010

(65) Prior Publication Data
US 2011/0218376 A1 Sep. 8, 2011

(30) Foreign Application Priority Data

Sep. 18, 2008 (JP) ................ P2008-239821

(51) Int. Cl.
*C10G 3/00* (2006.01)
*C10G 65/02* (2006.01)
*C10G 65/04* (2006.01)

(52) U.S. Cl.
USPC ............ 208/57; 208/49; 208/100; 208/102; 585/240

(58) Field of Classification Search
USPC ......... 208/49, 57, 60, 89, 100, 102, 133, 143, 208/144; 585/240, 250
See application file for complete search history.

(56) References Cited

U.S. PATENT DOCUMENTS 5,277,794 A * 1/1994 Delaney et al. ............. 208/143

7,232,935 B2 * 6/2007 Jakkula et al. ............... 585/240
(Continued)

FOREIGN PATENT DOCUMENTS

| CN | 1958728 | 5/2007 |
| CN | 101198675 | 6/2008 |

(Continued)

OTHER PUBLICATIONS

Notice of Allowance issued in relation to Japanese Patent Application No. 2008-239791, mailed Aug. 14, 2012.

(Continued)

*Primary Examiner* — Renee E Robinson
(74) *Attorney, Agent, or Firm* — Greenblum & Bernstein, P.L.C.

(57) ABSTRACT

The method for manufacturing a hydrocarbon oil of the present invention comprises a first step wherein a plurality of reaction zones filled with a specific catalyst is disposed in series and a feedstock oil containing an oxygen-containing hydrocarbon compound derived from an animal or vegetable oil is supplied and hydrotreated under the conditions of a hydrogen pressure of 1 MPa or more and 10 MPa or less in each of the reaction zones; and a second step wherein hydrogen, hydrogen sulfide, carbon dioxide and water are removed from a product to be treated obtained in the first step to obtain a hydrocarbon oil. Among the plurality of reaction zones, the inlet temperature of the reaction zone disposed on the most upstream side is 150° C. or more and 250° C. or less, the inlet temperature of the second most upstream reaction zone or below is equal to or higher than the condensation temperature of water, and the outlet temperature of the reaction zone disposed on the most downstream side is 260° C. or more and 360° C. or less. The feedstock oil comprises a recycled oil containing a specific amount of a part of the hydrocarbon oil obtained in the second step and a specific amount of a sulfur-containing hydrocarbon compound.

10 Claims, 1 Drawing Sheet

(56) References Cited

U.S. PATENT DOCUMENTS

| | | |
|---|---|---|
| 2006/0207166 A1 | 9/2006 | Herskowitz et al. |
| 2007/0135666 A1 | 6/2007 | Koivusalmi et al. |
| 2008/0308457 A1* | 12/2008 | Dindi et al. ........... 208/135 |
| 2009/0112041 A1 | 4/2009 | Germaine et al. |
| 2009/0229172 A1 | 9/2009 | Brady et al. |

FOREIGN PATENT DOCUMENTS

| | | |
|---|---|---|
| EP | 1396531 | 3/2004 |
| JP | 2000-328070 | 11/2000 |
| JP | 2003-171670 | 6/2003 |
| JP | 2005-154647 | 6/2005 |
| JP | 2007-153928 | 6/2007 |
| JP | 2007-308563 | 11/2007 |
| JP | 2009-019175 | 1/2009 |
| WO | 2007/063874 | 6/2007 |
| WO | 2007/068796 | 6/2007 |
| WO | 2007/068800 | 6/2007 |
| WO | 2007/132843 | 11/2007 |
| WO | 2007/142013 | 12/2007 |

OTHER PUBLICATIONS

"Cleaning up chlorine", Mine & Quarry 25 (5), Jun. 1996, pp. 33-34, 36, 38.

U.S. Appl. No. 13/119,310 to Tatsuo Hamamatsu et al., which is the National Stage of PCT/JP2009/066158 filed on Sep. 16, 2009.

International Search Report for PCT/JP2009/066164, mailed Oct. 13, 2009.

International Preliminary Report on Patentability for PCT/JP2009/066164, mailed Apr. 28, 2011.

Notice of Allowance for U.S. Appl. No. 13/119,310, mailed on Jun. 28, 2013.

Office Action for Indonesian Patent Application No. WO0201101342, mailed on Jun. 19, 2013.

* cited by examiner

PROCESS FOR PRODUCING HYDROCARBON OIL

TECHNICAL FIELD

The present invention relates to a method for manufacturing a hydrocarbon oil.

BACKGROUND ART

Attention is paid to effective utilization of biomass energy as a preventive measure for global warming. Above all, since biomass energy derived from plants can effectively use carbon fixed from carbon dioxide in the atmosphere by photosynthesis during the growth process of plants, it has a property which is the so-called carbon neutrality and does not contribute to an increase in carbon dioxide in the atmosphere from the viewpoint of the life cycle.

The utilization of such biomass energy has been widely studied even in the field of a transportation fuel. For example, if a fuel derived from an animal or vegetable oil can be used as a diesel fuel, it is expected to play an important role in the reduction of carbon dioxide emission by the synergistic effect with the high energy efficiency of a diesel engine. As a diesel fuel using an animal or vegetable oil, generally known is a fatty acid methyl ester oil (abbreviated as FAME from the initial letters of fatty acid methyl ester). FAME is manufactured by subjecting a triglyceride, which is a general structure of an animal or vegetable oil, to ester exchange with methanol by the action of an alkali catalyst or the like.

However, as described in Patent Document 1, it is pointed out that the process for manufacturing FAME has problems. For example, a by-product glycerin is required to be treated and cost and energy are required for cleaning of a product oil, or the like.

In addition, since FAME has two oxygen atoms in the molecule, it has an extremely high oxygen content as a fuel. Therefore, another problem thereof is that there is concern that the oxygen content may adversely affect the engine material even when FAME is used by blending it with a conventional diesel fuel derived from petroleum.

Consequently, a method of manufacturing a fuel oil comprising a hydrocarbon which contains substantially no oxygen by hydrodeoxygenating a feedstock oil containing an oxygen-containing hydrocarbon compound derived from an animal or vegetable oil in the presence of a hydrotreatment catalyst is studied (for example, refer to Patent Document 2 and Patent Document 3).

CITATION LIST

Patent Literature

[Patent document 1] Japanese Patent Laid-Open No. 2005-154674
[Patent document 2] Japanese Patent Laid-Open No. 2003-171670
[Patent document 3] Japanese Patent Laid-Open No. 2007-3080563

SUMMARY OF INVENTION

Technical Problem

However, the above conventional manufacturing methods have room for improvement with respect to the following points.

Specifically, it is required to suppress temperature increase because the hydrodeoxygenation reaction of a feedstock oil containing an oxygen-containing hydrocarbon compound derived from an animal or vegetable oil in the presence of a hydrotreatment catalyst is an exothermic reaction and there are problems such as that the need to improve the heat resistance of a reactor for an increase in reaction temperature, more high-temperature side reactions and the occurrence of a runaway reaction at a high temperature. In addition, in a general exothermic reaction, a method in which a cooling apparatus is installed in a reactor to remove the reaction heat or a method in which a raw material is diluted with an inactive substance (diluent) is employed. However, in the former method, the reactor becomes very expensive. On the other hand, in the latter method, there are limitations such as the necessity of using a large amount of an inactive substance in order to obtain a sufficient effect on suppressing the heat generation, and the necessity of excessive enlargement of the apparatus.

Further, in order to manufacture a hydrocarbon oil by hydrodeoxygenating a feedstock oil containing an oxygen-containing hydrocarbon compound derived from an animal or vegetable oil in the presence of a hydrotreatment catalyst for the purpose of reducing the emission of carbon dioxide, unless the reaction heat removed can be effectively recovered as energy, the emission of carbon dioxide corresponding to the energy cannot be reduced.

On the other hand, if a feedstock oil containing an oxygen-containing hydrocarbon compound derived from an animal or vegetable oil is used, it is not preferable from the viewpoint of corrosion protection of the apparatus and unit because a water-soluble lower fatty acid such as formic acid and propionic acid may be produced during hydrotreatment.

The present invention has been made in consideration of the above problems inherent in the prior art, and an object of the present invention is to provide a method for manufacturing a hydrocarbon oil which can achieve all of the suppression of the heat generation amount by reaction and the suppression of energy loss, the reduction of the amount used of a diluent as well as the suppression of the corrosion of the apparatus and unit.

Solution to Problem

In order to solve the above problems, the present invention provides a method for manufacturing a hydrocarbon oil, comprising: a first step wherein a plurality of reaction zones filled with a catalyst which contains a porous inorganic oxide comprising two or more elements selected from aluminum, silicon, zirconium, boron, titanium and magnesium and one or more metals selected from Group 6A and Group 8 elements of the periodic table supported on the porous inorganic oxide is disposed in series and a feedstock oil containing an oxygen-containing hydrocarbon compound derived from an animal or vegetable oil is supplied and hydrotreated under the conditions of a hydrogen pressure of 1 MPa or more and less than 10 MPa in each of the reaction zones; and a second step wherein hydrogen, hydrogen sulfide, carbon dioxide and water are removed from a product to be treated obtained in the first step to obtain a hydrocarbon oil, wherein, among the plurality of reaction zones, the inlet temperature of the reaction zone disposed on the most upstream side is 150° C. or more and 250° C. or less, the inlet temperature of the second most upstream reaction zone or below is equal to or higher than the condensation temperature of water, the outlet temperature of the reaction zone disposed on the most downstream side is 260° C. or more and 360° C. or less, and wherein the feedstock oil supplied to the first step contains: a recycled oil in which a part of the hydrocarbon oil obtained in the second step is recycled and supplied in an amount of 0.5- to 5-fold by mass to the oxygen-containing hydrocarbon compound contained in the feedstock oil; and 1 to 50 ppm by mass of a sulfur-containing hydrocarbon compound in terms of the sulfur atom to the oxygen-containing hydrocarbon compound contained in the feedstock oil.

That is, the method for manufacturing the hydrocarbon oil of the present invention comprises the first and second steps and if the number of the reaction zones in the first step is represented by n (n is an integer of 2 or more) and the inlet temperature and the outlet temperature of the k-th reaction zone from the most upstream side are represented by $t_k$ and $T_k$ (k is an integer in the range of 2 to n), respectively, the inlet temperature $t_1$ of the reaction zone disposed on the most upstream side is set at 150° C. or more and 250° C. or less, the inlet temperatures $t_2, t_3, \ldots, t_n$ of the second most upstream reaction zone or below are each set equal to or more than the condensation temperature of water and $T_n$ ($=T_{last}$) of the reaction zone of the most downstream side is set at 260° C. or more and 360° C. or less. And, to the feedstock oil supplied to the first step are added a recycled oil in which a part of the hydrocarbon oil obtained in the second step is supplied and recycled in an amount of 0.5- to 5-fold by mass based on the oxygen-containing hydrocarbon compound contained in the feedstock oil and 1 to 50 ppm by mass of a sulfur-containing hydrocarbon compound in terms of the sulfur atom based on the oxygen-containing hydrocarbon compound contained in the feedstock oil.

Here, if the feedstock oil is hydrotreated, the hydrodeoxygenation reaction of the oxygen-containing hydrocarbon compound derived from an animal or vegetable oil proceeds to produce a hydrocarbon. The term "hydrodeoxygenation reaction" as used herein means a reaction in which oxygen atoms constituting the oxygen-containing hydrocarbon compound are removed to add hydrogen to the cleaved sites. For example, either a fatty acid triglyceride or a fatty acid has an oxygen-containing group such as an ester group and a carboxyl group, and the oxygen atoms contained in these oxygen-containing groups are removed by hydrodeoxygenation reaction and the oxygen-containing hydrocarbon compound is converted into a hydrocarbon. There are mainly two reaction pathways for the hydrodeoxygenation of an oxygen-containing group which a fatty acid triglyceride and the like have. A first reaction pathway is a decarboxylation pathway in which the oxygen-containing group of the fatty acid triglyceride and the like are directly released as carbon dioxide, and the oxygen atoms are removed as carbon dioxide. A second reaction pathway is a hydrogenation pathway in which the oxygen-containing group is reduced through aldehyde and alcohol while the carbon number of the fatty acid triglyceride and the like is maintained. In this case, the oxygen atoms are converted into water. When these reactions proceed in parallel, a hydrocarbon, water and carbon dioxide are generated.

The reaction schemes of the hydrodeoxygenation as an example of an alkyl ester of stearic acid are shown in the following formulas (1) and (2). The reaction scheme represented by the formula (1) corresponds to the first reaction pathway, and the reaction scheme represented by the formula (2) corresponds to the second reaction pathway. In addition, R in the formulas (1) and (2) represents an alkyl group.

(1)

(2)

In the method for manufacturing the hydrocarbon oil of the present invention, when a feedstock oil containing an oxygen-containing hydrocarbon compound derived from an animal or vegetable oil is hydrotreated, among the two hydrodeoxygenation reaction pathways, the ratio of the first reaction pathway in which the reaction heat is lower can be enlarged by incorporating a specific amount of each of a recycled oil, which is a part of a product to be treated obtained in the above steps and/or a hydrocarbon oil, and a sulfur-containing hydrocarbon compound into the feedstock oil and employing the specific catalyst and reaction conditions. As a result, it is possible to suppress the heat generation amount itself by the reaction as well as to reduce the amount used of a diluent.

In each of the plurality of reaction zones according to the first step, preferably, the difference between the outlet temperature and the inlet temperature is 80° C. or less and the sum of the difference between the outlet temperature and the inlet temperature in each of the reaction zones is 200° C. or less. That is, preferably, the difference $\Delta T_k$ between the outlet temperature $T_k$ and the inlet temperature $t_k$ of the k-th reaction zone is 80° C. or less and the hydrotreatment is performed under the condition that the total temperature increase amount ($\Sigma \Delta T_k$, k=an integer of 1 to n), which is the sum of $\Delta T_k$ for the whole reaction zone, is 200° C. or less.

Further, in the method for manufacturing the hydrocarbon oil of the present invention, it is preferable to control the inlet temperature of the reaction zone downstream of the supplying position of a quench oil by supplying a part of the hydrocarbon oil as quench oil between the adjacent reaction zones among the plurality of the reaction zones. That is, it is preferable to control the inlet temperature $t_k$ of the k-th reaction zone by supplying a part of the hydrocarbon oil as quench oil between the k−1-th reaction zone and k-th reaction zone from the upstream side. The supplying position of the quench oil may be arbitrarily selected and may be between parts of the reaction zones or between the whole of the reaction zones.

In the present invention, preferably, the hydrocarbon oil obtained in the second step is fractionated into a light distillate, a middle distillate and a heavy distillate, and the cut temperature between the light distillate and the middle distillate is set at 100 to 200° C. and the cut temperature between the middle distillate and the heavy distillate is set at 300 to 400° C.

In addition, the method for manufacturing a hydrocarbon oil of the present invention preferably further comprises a third step wherein a hydrocarbon oil obtained in the second step or a middle distillate fractionated from the hydrocarbon oil is isomerized. Further, preferably, an isomerized oil obtained in the third step is fractionated into a light distillate, a middle distillate and a heavy distillate, and the cut temperature between the light distillate and the middle distillate is set at 100 to 200° C. and the cut temperature between the middle distillate and the heavy distillate is set at 300 to 400° C.

In addition, the recycled oil and/or quench oil preferably contain a part of the hydrocarbon oil obtained in the second step. Further, the recycled oil and/or quench oil preferably contain a part of a middle distillate fractionated from a hydrocarbon oil, a part of a product obtained by isomerizing a hydrocarbon oil or a middle distillate fractionated from a hydrocarbon oil, or a part of a middle distillate fractionated from a product obtained by isomerizing a hydrocarbon oil or a middle distillate fractionated from a hydrocarbon oil.

Further, an oxygen-containing hydrocarbon compound contained in a feedstock oil is preferably one or more compounds selected from fatty acids and fatty acid esters, and more is preferably a triglyceride of a fatty acid.

In addition, preferably, a catalyst used for hydrotreatment has a pore volume of 0.30 to 0.85 ml/g as measured by a nitrogen adsorption BET method and an average pore diameter of 5 to 11 nm, and the ratio of the pore volume derived from pores having a pore diameter of 3 nm or less to the total pore volume is 35% by volume or less.

Further, the porous inorganic oxide contained in the catalyst preferably contains the element phosphorus.

Advantageous Effects of Invention

As described above, the present invention provides a method for manufacturing a hydrocarbon oil which can achieve all of the suppression of the heat generation amount by reaction, the suppression of energy loss, the reduction of the amount used of a diluent and the suppression of the corrosion of the apparatus and unit.

DESCRIPTION OF EMBODIMENTS

Figure 1:
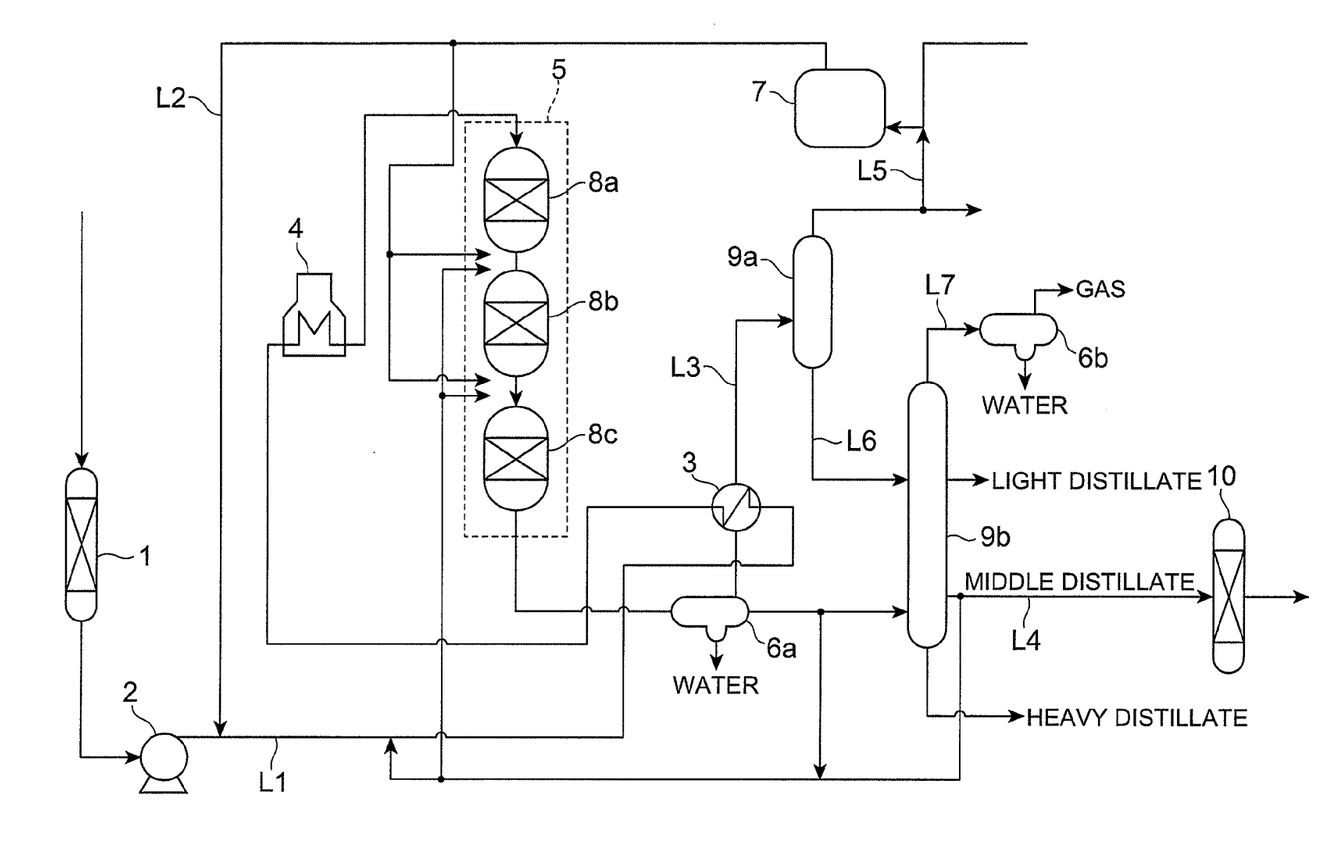
FIG. 1 is a flow diagram showing an example of a manufacturing facility used for a method for manufacturing a hydrocarbon oil.

Hereinafter, the preferred embodiments of the present invention will be described in detail with reference to the drawing.

FIG. 1 is a flow diagram showing an example of a manufacturing facility used for a method for manufacturing a hydrocarbon oil according to the present embodiment. In the manufacturing facility shown in FIG. 1, there is installed a flow channel L1 in which a pretreatment apparatus 1, a pump 2, a heat exchanger 3, a heater 4, a hydrotreatment reactor 5 and a separator 6a are connected in this order from the upstream side.

The pretreatment apparatus 1 is filled with an adsorbent which enables removal of impurities such as foreign substances in the feedstock oil supplied. A feedstock oil from which impurities are removed is drawn to the flow channel L1 by the pump 2 and mixed with hydrogen from a flow channel L2. Thereafter, the mixture is heated by the heat exchanger 3 and the heater 4 and then transferred to the hydrotreatment reactor 5. In addition, a PSA gas separator apparatus 7 is installed in the flow channel L2, which can supply high quality hydrogen. Further, a part of the hydrogen may be supplied to the hydrotreatment reactor 5 as quench hydrogen.

The hydrotreatment reactor 5 comprises three reaction zones 8a, 8b and 8c, and each of the reaction zones is filled with a catalyst described later. As the form of the reactor, a fixed bed system may be employed. That is, hydrogen may be supplied by either a counter flow system or a cocurrent flow system for the feedstock oil. In addition, when a plurality of reactors is used, a combination of a counter flow system and a cocurrent flow system may be employed. A cocurrent gas-liquid downflow system may be employed as the general form. Further, the reactor may be used alone or in combination of a plurality of reactors, and a structure in which the inside of a reactor is divided into a plurality of catalyst beds may be employed. The reaction zones 8a, 8b and 8c may be constituted either by a single catalyst bed or by a plurality of catalyst beds. In addition, FIG. 1 shows an example in which there are three reaction zones, but the number of the reaction zones is not particularly limited and there may be two or four or more reaction zones. Further, the reaction zones may be separately installed in series in a single reactor. In addition, the hydrotreatment reactors having two or more reaction zones disposed in series may be disposed in series or in parallel to perform the hydrotreatment.

The feedstock oil transferred to the hydrotreatment reactor 5 is hydrotreated and then transferred to the separator 6a. In the separator 6a, a product to be treated after hydrotreatment is separated into a gas phase component containing hydrogen, hydrogen sulfide and carbon dioxide and a liquid phase component containing a hydrocarbon oil obtained by hydrotreatment, and in addition, water is separated and removed from the liquid phase component. On the downstream side of the separator 6a, a flow channel L3 which has a channel introduced into a fractionator 9a through the heat exchanger 3, and a flow channel L4 which has a fractionator 9b and an isomerization reactor 10 in this order are installed.

The gas phase component separated in the separator 6a is cooled by the heat exchanger 3 to liquefy and then is separated into a gas phase component and a liquid phase component (light distillate) in the fractionator 9a. The gas phase component contains unreacted hydrogen. However, the hydrogen is returned to the flow channel L2 through a flow channel L5 and reused after removing impurities in a PSA gas separator apparatus 7. On the other hand, the liquid phase component (substantially, a hydrocarbon oil) is transferred to the fractionator 9b from the fractionator 9a through a flow channel L6. In addition, the liquid phase component (substantially, a hydrocarbon oil) from which water is separated and removed in a separator 6a is transferred to the fractionator 9b through the flow channel L4.

Further, FIG. 1 shows an example in which the heat exchanger 3 is installed on the downstream side of the separator 6a, but the heat exchanger 3 may be installed on the upstream side of the separator 6a, or the heat exchanger 3 per se may not be installed.

In the fractionator 9b, the liquid phase component transferred from the fractionator 9a through the flow channel L6 and the liquid phase component from the separator 6a are separated into a gas phase component, a light distillate, a middle distillate and a heavy distillate. Among these components, the middle distillate is isomerized in the isomerization reactor 10. In addition, the gas phase component is transferred to the separator 6b through a flow channel L7 and then is separated into a gas phase and a liquid phase (aqueous phase).

Further, the flow channel L4 is branched between the separator 6a and the fractionator 9b and between the fractionator 9b and the isomerization reactor 10. The other end of the branched channel L4 is further branched into two channels. One branch is connected to the flow channel L1 between the pump 2 and the heat exchanger 3, and another branch is connected to a predetermined position between the reaction zone 8a and 8b and between 8b and 8c of the hydrotreatment reactor 5. Thereby, the hydrocarbon oil separated in the separator 6a and the fractionator 9b can be used as a recycled oil or quench oil.

In addition, FIG. 1 shows an example in which the fractionator 9b is disposed on the upstream side and the isomerization reactor 10 is disposed on the downstream side, but the disposition of the fractionator 9b and the isomerization reactor 10 may be reversed.

Hereinafter, a method for manufacturing a hydrocarbon oil will be described in detail using a manufacturing facility shown in FIG. 1.

(Feedstock Oil)

In the present invention, there are used an oxygen-containing compound derived from an animal or vegetable oil, a specific recycled oil and quench oil as well as a feedstock oil containing a sulfur-containing hydrocarbon compound. In addition, at the time of the start-up of the hydrotreatment, a fatty acid hydrocarbon compound corresponding to the recycled oil and quench oil is prepared in advance and a product obtained by incorporating the hydrocarbon compound into the feedstock oil may be subjected to hydrotreatment.

As the oxygen-containing compound derived from an animal or vegetable oil, an oil and fat component derived from an animal or vegetable oil or a product derived from the component are preferred because the decarboxylation reaction is likely to occur. Here, the oil and fat component contains an animal or vegetable oil and fat and an animal or vegetable oil component which are naturally or artificially produced or manufactured and/or a component produced or manufactured by deriving these oils and fats and a component which is added for the purpose of maintaining or improving the performance of these oils and fats. In addition, the derivative of the oil and fat component comprises a component which is produced as a by-product in the step of manufacturing the oil and fat product or a component which is intentionally processed into a derived product.

Examples of the oil and fat component derived from an animal or vegetable oil include beef fat, corn oil, rapeseed oil, soybean oil and palm oil. In the present invention, as the oil and fat component derived from an animal or vegetable oil, any of oils and fats may be used and waste oil obtained after using these oils and fats may be used. However, a vegetable fat and oil is preferable from the carbon neutral viewpoint, and rapeseed oil, soybean oil and palm oil are more preferable from the viewpoint of the carbon number of the fatty acid alkyl chain and the reactivity. In addition, the oils and fats may be used alone or may be used by mixing two or more kinds of them.

The derivative of the oil and fat component derived from an animal or vegetable oil may contain a component which is processed into an ester such as a fatty acid constituting a fatty acid triglyceride of the oil and fat component or a methyl ester thereof. Typical examples of the fatty acid constituting these fatty acid triglycerides include butyric acid ($C_3H_7COOH$), caproic acid ($C_5H_{11}COOH$), caprylic acid ($C_7H_{15}COOH$), capric acid ($C_9H_{19}COOH$), lauric acid ($C_{11}H_{23}COOH$), myristic acid ($C_{13}H_{27}COOH$), palmitic acid ($C_{15}H_{31}COOH$) and stearic acid ($C_{17}H_{35}COOH$), which are called saturated fatty acids having no unsaturated bond in the molecular structure; and oleic acid ($C_{17}H_{33}COOH$), linoleic acid ($C_{17}H_{31}COOH$), linolenic acid ($C_{17}H_{29}COOH$), ricinoleic acid ($C_{17}H_{32}(OH)COOH$) and the like, which are unsaturated fatty acids having one or a plurality of unsaturated bonds.

The recycled oil and quench oil play the role of suppressing the temperature increase due to the reaction heat in the hydrotreatment. In the present invention, as described above, as the recycled oil and quench oil, a part of the hydrocarbon oil (distillate oil), which is obtained by removing hydrogen, hydrogen sulfide, carbon dioxide and water from the product to be treated obtained from the hydrotreatment, is recycled and supplied to the feedstock oil.

The recycled oil and quench oil preferably contain a part of the hydrocarbon oil. In addition, the recycled oil and quench oil preferably contain a part of a middle distillate obtained by fractionating a hydrocarbon oil, a part of a product obtained by isomerizing a hydrocarbon oil or a middle distillate fractionated from a hydrocarbon oil, or a part of a middle distillate fractionated from a product obtained by isomerizing a hydrocarbon oil or a middle distillate fractionated from the hydrocarbon oil. When these components are recycled and supplied to the feedstock oil, the components are preferably cooled in advance.

The content of the recycled oil in the feedstock oil is 0.5- to 5-fold by mass to an oxygen-containing hydrocarbon compound derived from an animal or vegetable oil, and the ratio is determined within the above range depending on the maximum use temperature of a reactor. For this reason, if it is assumed that both oils have the same specific heat, the reaction heat may be sufficiently reduced if the content of both oils is within the above range, because if both oils are mixed at a ratio of 1 to 1, the temperature increase becomes half that of the case where a substance derived from an animal or vegetable oil is reacted singly. In addition, if the content of the recycled oil is higher than 5-fold by mass of the oxygen-containing hydrocarbon compound, the concentration of the oxygen-containing hydrocarbon compound decreases and the reactivity decreases, and in addition, the flow rate of pipes and the like increases and the load increases. On the other hand, if the content of the recycled oil is lower than 0.5-fold by mass of the oxygen-containing hydrocarbon compound, the temperature increase may not be sufficiently suppressed.

The method of mixing of the feedstock oil and recycled oil is not particularly limited, but for example, both oils are mixed in advance and the mixture may be introduced into a reactor of the hydrotreatment reactor 5, or when a feedstock oil is introduced into the reactor, the feedstock oil may be supplied at the previous stage of the reactor. Further, it is possible that a plurality of reactors are connected in series and then the feedstock oil is introduced between the reactors, or the catalyst layer is divided in a single reactor and then the feedstock oil is introduced between the catalyst layers.

In addition, the sulfur-containing hydrocarbon compound plays the role of improving the deoxygenation activity in hydrotreatment. The sulfur-containing hydrocarbon compound is not particularly limited, but specifically includes a sulfide, disulfide, polysulfide, thiol, thiophene, benzothiophene, dibenzothiophene and a derivative thereof. The sulfur-containing hydrocarbon compound contained in the feedstock oil may be a single compound or a mixture of two or more kinds of compounds. Further, a petroleum hydrocarbon fraction containing a sulfur content may be added to the feedstock oil.

As the petroleum hydrocarbon fraction containing a sulfur content, a fraction obtained by a typical petroleum refining step may be used. For example, there may be used a fraction corresponding to a predetermined boiling point range obtained by an atmospheric distillation apparatus or a vacuum distillation apparatus or a distillate corresponding to a predetermined boiling point range obtained by a hydrodesulfurization apparatus, a hydrocracking apparatus, a residual oil direct desulfurization apparatus, a fluid catalytic cracking apparatus or the like. In addition, the fraction obtained from each of the above apparatuses may be used alone or may be used by mixing two or more kinds of them.

The content of the sulfur-containing hydrocarbon compound is required to be 1 to 50 pp by mass in terms of the sulfur atom to the oxygen-containing hydrocarbon compound derived from an animal or vegetable oil, and preferably is 5 to 30 ppm by mass and more preferably 10 to 20 ppm by mass. If the content of the sulfur-containing hydrocarbon compound is less than 1 ppm by mass in terms of the sulfur atom, it tends to become difficult to stably maintain the deoxygenation activity. On the other hand, if the content of the sulfur-containing hydrocarbon compound exceeds 50 ppm by mass in terms of the sulfur atom, the sulfur concentration in the light gas discharged in the hydrotreatment step increases and the sulfur content contained in the oil to be treated or hydrocarbon oil tends to increase, and thus the sulfur content may adversely affect an engine exhaust gas purification apparatus when the fraction is used as a fuel for a diesel engine and the like. In addition, the sulfur content in the present invention means the mass content of the sulfur content as measured according to JIS K 2541 "Determination of Sulfur Content" or the method described in ASTM-5453.

In the present invention, the addition of the recycled oil and the sulfur-containing hydrocarbon compound to the feedstock oil may be performed simultaneously or separately, but preferably, after the recycled oil is added to the feedstock oil, the sulfur-containing compound is further added. In addition, the sulfur-containing hydrocarbon compound is mixed with a mixture of the feedstock oil and the recycled oil in advance and then the resulting mixture may be introduced into the reactor of the hydrotreatment reactor, or the sulfur-containing hydrocarbon compound may be supplied at the previous stage of the reactor when the mixture oil of the feedstock oil and the recycled oil is introduced into the reactor.

(Hydrotreatment)

In the hydrotreatment reactor 5, each of the reaction zones 8a, 8b and 8c is filled with a catalyst containing a porous inorganic oxide comprising two or more elements selected from aluminum, silicon, zirconium, boron, titanium and magnesium and one or more metals selected from Group 6A and Group 8 elements of the periodic table supported on the porous inorganic oxide.

As a support of the catalyst used in the present invention, as described above, a porous inorganic oxide comprising two or more elements selected from aluminum, silicon, zirconium, boron, titanium and magnesium is used. Such a porous inorganic oxide is preferably an inorganic oxide containing two or more elements selected from aluminum, silicon, zirconium, boron, titanium and magnesium from the viewpoint of being capable of further improving the deoxygenation activity and the desulfurization activity, and is more preferably an inorganic oxide (composite oxide of an aluminum oxide and other oxides) containing aluminum and other elements.

If the porous inorganic oxide contains aluminum as a constituent element, the content of aluminum is preferably 1 to 97% by mass, more preferably 10 to 97% by mass and much more preferably 20 to 95% by mass in terms of alumina, based on the total amount of the porous inorganic oxide. If the content of aluminum is less than 1% by mass in terms of alumina, physical properties such as the acid properties of the support are not preferable and neither sufficient deoxygenation activity nor desulfurization activity tend to be exhibited. On the other hand, if the content of aluminum exceeds 97% by mass in terms of alumina, the catalyst surface area becomes insufficient and the activity tends to decrease.

There is no particular limitation on a method for introducing silicon, zirconium, boron, titanium and magnesium, which are constituent elements of a support other than aluminum, into a support, and a solution containing these elements or the like may be used as a raw material. For example, there may be used silicon, sodium silicate solution and silica sol and the like as silicon; boric acid and the like as boron; phosphoric acid or an alkali metal salt of phosphoric acid or the like as phosphorus; titanium sulfide, titanium tetrachloride, various alkoxide salts or the like as titanium; and zirconium sulfate or various alkoxide salts or the like as zirconium.

Further, the porous inorganic oxide preferably contains phosphorus as a constituent element. The content of phosphorus is preferably 0.1 to 10% by mass, more preferably 0.5 to 7% by mass and much more preferably 2 to 6% by mass based on the total amount of the porous inorganic oxide. If the content of phosphorus is less than 1% by mass, nether sufficient deoxygenation activity nor sufficient desulfurization activity tend to be exhibited, and if the content of phosphorus exceeds 10% by mass, excessive cracking proceeds and the desired yield of the hydrocarbon oil is likely to decrease.

The raw materials of the constituent components of a support other than aluminum oxide are preferably added in a step before the calcination of the support. For example, the raw materials are added to an aluminum aqueous solution in advance and then an aluminum hydroxide gel containing these constituent components may be prepared or the raw materials may be added to the aluminum hydroxide gel prepared. Alternatively, the raw materials may be added in a step in which water or an acidic aqueous solution is added to a commercially available aluminum oxide intermediate or boehmite powders and the resulting mixture is kneaded, but the raw materials are preferably allowed to coexist at the step of preparing an aluminum hydroxide gel. Although the mechanism of the effect of the constituent components of a support other than aluminum oxide has not necessarily been elucidated, it is inferred that the constituent components form a complex oxide state with aluminum. It is considered that this causes an increase in the support surface area and the interaction with the active metals, thereby exercising an influence on the activity.

The porous inorganic oxide as a support is supported with one or more metals selected from Group 6A and Group 8 of the periodic table. Among these metals, it is preferable to use a combination of two or more metals selected from cobalt, molybdenum, nickel and tungsten. The preferred combination includes, for example, cobalt-molybdenum, nickel-molybdenum, nickel-cobalt-molybdenum and nickel-tungsten. Among these, more preferred is a combination of nickel-molybdenum, nickel-cobalt-molybdenum and nickel-tungsten. At the time of hydrotreatment, these metals are converted into a sulfide state to use.

As the content of the active metal based on the catalyst mass, the range of the total supported amount of tungsten and molybdenum is preferably 12 to 35% by mass and more preferably 15 to 30% by mass in terms of the oxide. If the total supported amount of tungsten and molybdenum is less than 12% by mass, the active sites decrease and sufficient activity does not tend to be obtained. On the other hand, if the total supported amount of tungsten and molybdenum exceeds 35% by mass, the metals are not effectively dispersed and sufficient activity does not tend to be obtained. The range of the total supported amount of cobalt and nickel is preferably 1.0 to 15% by mass and more preferably 1.5 to 12% by mass in terms of the oxide. If the total supported amount of cobalt and nickel is less than 1.0% by mass, a sufficient cocatalyst effect is not obtained and the activity tends to decrease. On the other hand, if the total supported amount of cobalt and nickel exceeds 15% by mass, the metals are not effectively dispersed and sufficient activity does not tend to be obtained.

There is no particular limitation on a method for incorporating a catalyst into these active metals, and a well-known method which is applied when a general desulfurization catalyst is produced may be employed. Generally, a method in which a catalyst support is impregnated with a solution containing a salt of an active metal is preferably used. In addition, an equilibrium adsorption method, a pore-filling method, an incipient-wetness method and the like are preferably employed. For example, the pore-filling method is a method in which the pore volume of a support is measured in advance and then the support is impregnated with the same volume of a metal salt solution. In addition, the impregnation method is not particularly limited, and a support may be impregnated by a suitable method depending on the supported amount of the metal and physical properties of the catalyst support.

In the present invention, there is no limitation on the number of types of the hydrotreatment catalysts to be used. For example, one type of catalyst may be used singly or a plurality of catalysts different in active metal species or support-constituting components may be used. Examples of a suitable combination when using a plurality of different catalysts include a catalyst containing cobalt-molybdenum at the subsequent stage of a catalyst containing nickel-molybdenum, a catalyst containing nickel-cobalt-molybdenum at the subsequent stage of a catalyst containing nickel-molybdenum, a catalyst containing nickel-cobalt-molybdenum at the subsequent stage of a catalyst containing nickel-tungsten, and a catalyst containing cobalt-molybdenum at the subsequent stage of a catalyst containing nickel-cobalt-molybdenum. A nickel-molybdenum catalyst may be further combined at the previous and/or subsequent stage of the combinations thereof.

When combining a plurality of catalysts different in support components, there may be used, for example, a catalyst having a content of aluminum oxide of 80 to 99% by mass at the subsequent stage of a catalyst having a content of aluminum oxide of 30% by mass or more and less than 80% by mass based on the total mass of the support.

Each catalyst used in the present invention may be used after it is presulfided in the same manner as that of a general hydrodesulfurization catalyst. For example, by using a product obtained by adding a sulfur-containing hydrocarbon compound to a hydrocarbon oil obtained in the step of the present invention or a petroleum-based hydrocarbon oil, heat of 200° C. or more is given under the condition of hydrogen pressure according to a predetermined procedure. By this procedure, the active metal on the catalyst becomes a sulfurized state and exhibits the activity. The sulfur-containing hydrocarbon compound is not particularly limited, but specifically includes a sulfide, disulfide, polysulfide, thiol, thiophene, benzothiophene, dibenzothiophene and a derivative thereof. The sulfur-containing hydrocarbon compounds may be a single compound or a mixture of two or more kinds of compounds. Further, a petroleum hydrocarbon fraction containing a sulfur content may be directly used.

The presulfiding may be performed in the same reactor as that used for the hydrodeoxygenation reaction. In addition, there can be used a catalyst which is subjected to presulfiding or a catalyst which is subjected to activation treatment using a sulfur-containing, oxygen-containing or nitrogen-containing organic solvent.

Further, other than the hydrotreatment catalyst, a guard catalyst, a demetallization catalyst and an inactive filler may be used, where necessary, for the purpose of trapping the scale content which flows in accompanied by a feedstock oil and supporting the hydrotreatment catalyst at the partition part of the catalyst bed. In addition, these may be used alone or in combination thereof.

The pore volume of the catalyst used in the present invention, which is measured by a nitrogen adsorption BET method, is preferably 0.30 to 0.85 ml/g and more preferably 0.45 to 0.80 ml/g. If the pore volume is less than 0.30 ml/g, the dispersibility of the metal supported becomes insufficient and the active sites may decrease. In addition, the pore volume exceeds 0.85 ml/g, the catalyst strength becomes insufficient and the catalyst may be powdered and broken when in use.

Further, the catalyst has an average pore diameter of preferably 5 to 11 nm and more preferably 6 to 9 nm, as determined by the above method. If the average pore diameter is less than 5 nm, the reaction substrate is not sufficiently spread in the pores and the reactivity may decrease. In addition, if the average pore diameter exceeds 11 nm, the pore surface area decreases and the activity may become insufficient.

In addition, in the catalyst, in order to maintain the effective catalyst pore and exhibit sufficient activity, the ratio of the pore volume derived from pores having a pore diameter of 3 nm or less to the total pore volume is preferably 35% by volume or less.

In each of the reaction zones, $8a$, $8b$ and $8c$, which are filled with the catalyst, the feedstock oil is hydrotreated in the presence of hydrogen under the conditions of a hydrogen pressure of 1 MPa or more and less than 10 MPa.

As described above, the hydrogen pressure is required to be 1 MPa or more and less than 10 MPa, and preferably is 2 to 8 MPa and more preferably 3 to 6 MPa. If the hydrogen pressure is 10 MPa or more, the ratio between the decarboxylation reaction and the dehydration reaction is constant. But if the hydrogen pressure is less than 10 MPa, the decarboxylation ratio increases according to the reduction of the pressure and the effect of suppressing the heat generation amount by the reaction appears. However, if the hydrogen pressure is less than 1 MPa, there is a tendency that the reactivity decreases or the activity rapidly decreases. In addition, if the ratio of the decarboxylation reaction is excessively increased, the yield of the hydrocarbon oil corresponding to the amount of the produced as a by-product carbon dioxide is impaired. Therefore, it is not suitable to increase the decarboxylation ratio until less than the lower limit.

In addition, the hydrogen oil ratio (hydrogen/oil ratio) in the hydrotreatment is in the range of preferably 100 to 1500 NL/L, more preferably 200 to 1200 NL/L and especially preferably 250 to 1000 NL/L. If the hydrogen oil ratio exceeds the upper limit, the increase effect of the ratio of the decarboxylation reaction in the above hydrogen pressure is impaired, and if the hydrogen oil ratio is less than the lower limit, sufficient hydrogenation may not proceed.

Further, the inlet temperature $t_1$ of the reaction zone $8a$ disposed on the most upstream side is 150° C. or more and 250° C. or less (preferably 170° C. or more and 240° C. or less), the inlet temperatures $t_2$ and $t_3$ of reaction zones $8b$ and $8c$ of the second or below are equal to or higher than the condensation temperature of water, and the outlet temperature $T_3$ of the reaction zone $8c$ disposed on the most downstream side is 260° C. or more and 360° C. or less (preferably 260° C. or more and 350° C. or less).

In addition, if the inlet temperature $t_1$ is lower than 150° C., sufficient hydrogenation does not proceed. On the other hand, if the inlet temperature $t_1$ exceeds 250° C., the amount of the recycled oil or quench oil is required to be increased and the energy efficiency decreases.

Further, if the inlet temperatures $t_2$ and $t_3$ are set at a temperature equal to or higher than the condensation temperature of water, it means that water produced as a by-product by the hydrotreatment is maintained in a vapor state between the reaction zones $8a$ and $8b$ and between the reaction zones $8b$ and $8c$. That is, the inlet temperatures $t_2$ and $t_3$ are less than the condensation temperature of water, water produced as a by-product by the reaction forms an aqueous phase and may contain a water-soluble lower fatty acid such as formic acid and propionic acid or further a water-soluble chlorine-containing compound or the like, thus causing the corrosion of the apparatus and unit. On the other hand, if the inlet temperatures $t_2$ and $t_3$ are set at a temperature equal to of higher than the condensation temperature of water, the corrosion of the apparatus and unit as described above may be sufficiently suppressed.

In addition, in order to maintain the water produced as a by-product in a vapor state, the temperature may be controlled so that the relation between the partial pressure PW (MPa) of the water produced as a by-product and the temperature T (° C.) at that time satisfies the conditions represented by the following formula (3), based on Tetens equation:

$$PW < 6.11 \times 10^{\{7.5 \times T \div (T+237.3)\}} \times 10^{-4} \quad (3)$$

That is, if the inlet temperature ($t_n$ (n is an integer of n≥2)) of the reaction zone of the second or below is controlled so that the formula (3) is satisfied, the inlet temperature may be set at a temperature equal to or higher than the condensation temperature of water.

Here, if it is assumed that the feedstock oil and the hydrotreated oil produced do not vaporize at all, the partial pressure is 0 MPa, and the decarboxylation reaction does not occur (assuming the case where the maximum amount of the by-product water is generated), and if the partial pressure is represented by P (MPa), the molar concentration of water is represented by MW (mol/l), the molar concentration of hydrogen is represented by MH (mol/l) and the molar concentration of propane is represented by MP (mol/l), PW is represented by the following formula (4):

$$PW = P \times MW \div (MW + MH + MP) \quad (4)$$

For example, if it is assumed that the ideal hydrodeoxygenation reaction occurs for a triglyceride of stearic acid having a fatty acid carbon number of 18 with a hydrogen amount of 500 NL/L and at a reaction pressure of 5 MPa, the hydrogen present in the initial reaction system is 23.0 moles per mole of the triglyceride of stearic acid because the hydrogen amount per L (865 g (0.97 moles)) of the triglyceride of stearic acid is 500 L (22.3 moles) assuming that the triglyceride of stearic acid has a molecular weight of 890 and a density of 0.865 g/cm³. Since from the formula (2), 12 moles of hydrogen is consumed per mole of the triglyceride of stearic acid at 100% reaction, and 6 moles of water and 1 mole of propane are generated, PW is represented by the following formula (5) if the reaction rate is represented by C (%):

$$PW = 5 \times (6 \times C) \div \{6 \times C + (23.0 \times 100 - 12 \times C) + 1 \times C\} \quad (5)$$

Accordingly, the condensation of the by-product water generated may be prevented by controlling the temperature according to the reaction rate of the formula (5) depending on the properties of the feedstock oil, hydrogen oil ratio and reaction pressure.

In addition, if the outlet temperature $T_3$ is lower than 260° C., sufficient hydrogenation does not proceed. On the other hand, if the outlet temperature $T_3$ is higher than 360° C., excessive cracking or polymerization of the feedstock oil and other side reactions may proceed.

In each of the reaction zones $8a$, $8b$ and $8c$, preferably, the differences between the outlet temperature and the inlet temperature, $\Delta T_1$ (=$T_1$-$t_1$), $\Delta T_2$ (=$T_2$-$t_2$) and $\Delta T_3$ (=$T_3$-$t_3$), are 80° C. or less and the total temperature increase amount $\Sigma \Delta T_n$ (=$\Delta T_1 + \Delta T_2 + \Delta T_3$), which is the sum of the difference between the outlet temperature and the inlet temperature in each reaction zone, is 200° C. or less. If $\Delta T_1$, $\Delta T_2$ and $\Delta T_3$ exceed 80° C., it is not preferable because the difference in coefficient of thermal expansion between the upper and lower portions of the reactor becomes large and as a result, metal fatigue is likely to occur. Further, if the total temperature increase amount $\Sigma \Delta T_n$ exceeds 200° C., it is not preferable because the difference in coefficient of thermal expansion between the upper and lower portions of the reactor becomes large and the reaction temperature control becomes difficult.

Examples of the temperature control method of the reaction zones, for $t_1$, include a method of adjusting the heating temperature of the feedstock oil by the heat exchanger 3 and the heater 4. For $t_2$ and $t_3$, it is preferable to control the inlet temperatures $t_2$ and $t_3$ of the reaction zones $8b$ and/or $8c$ on the more downstream side than the supplying position of quench oil by supplying a part of the hydrocarbon oil separated by the separator $6a$ or the fractionator $9b$ as the quench oil between the reaction zones $8a$ and $8b$ and/or between the reaction zones $8b$ and $8c$. In addition, hydrogen from the flow channel L2 may be used as quench hydrogen.

The product to be treated, which is hydrotreated in the hydrotreatment reactor 5, is fractionated into a hydrotreated oil containing a predetermined fraction through the gas-liquid separation step in the separator 6 or the fractionation step in the fractionators $9a$ and $9b$.

In addition, since by-products such as water, carbon monoxide, carbon dioxide and hydrogen sulfide are possibly generated accompanied by the reaction of the oxygen content or sulfur content contained in the feedstock oil, these by-products are required to be removed by installing a gas-liquid separation facility or other by-product gas removing apparatuses between a plurality of reactors or in the product recovery step. The apparatuses for removing by-products preferably include a high-pressure separator.

When the hydrocarbon oil (effluent) obtained after removing by-products is fractionated in the fractionator, the oil may be fractionated into a plurality of distillates, where necessary. For example, the hydrocarbon oil may be fractionated into a light distillate such as a gas and a naphtha fraction, a middle distillate such as kerosene, a jet fraction and a gas oil fraction, and a heavy distillate such as a residue fraction. In this case, the cut temperature between the light distillate and the middle distillate is preferably 100 to 200° C., more preferably 120 to 180° C. and much more preferably 140 to 160° C. In addition, the cut temperature between the middle distillate and the heavy distillate is preferably 300 to 400° C., more preferably 300 to 380° C. and much more preferably 300 to 360° C. Further, hydrogen may be produced by modifying a part of the light hydrocarbon fraction to be produced in a steam reforming apparatus. The hydrogen thus produced has a property which is the so-called carbon neutrality and can reduce the environmental load because the raw materials used for steam reforming are hydrocarbons derived from biomass.

Generally, the hydrogen gas is introduced from the inlet of the first reactor together with the feedstock oil before or after passing through the heater 4 (heating furnace). However, apart from this, the hydrogen gas may be introduced from between the catalyst beds or from between a plurality of reactors for the purpose of controlling the temperature within the reactor and maintaining the hydrogen pressure over the whole inside of the reactor. The hydrogen thus introduced is generally called quench hydrogen. The ratio of quench hydrogen to the hydrogen gas introduced together with the feedstock oil is preferably 10 to 60% by volume and more preferably 15 to 50% by volume. If the ratio of quench hydrogen is less than 10% by volume, the reaction at the subsequent reaction site does not tend to sufficiently proceed, and if the ratio of the quench hydrogen exceeds 60% by volume, the reaction in the vicinity of the reactor inlet does not tend to sufficiently proceed.

When the hydrocarbon oil manufactured by the present invention is used as a gas oil fraction base stock, the hydrocarbon oil contains at least a fraction having a boiling point of 260 to 300° C., and the hydrocarbon oil has preferably a sulfur content of 15 ppm by mass or less and an oxygen content of 0.5% by mass or less and more preferably a sulfur content of 12 ppm by mass or less and an oxygen content of 0.3% by mass or less. If the sulfur content and oxygen content exceed the above upper limit, they may exert an influence on a filter or a catalyst used in an exhaust gas treatment apparatus of a diesel engine and further the materials of the engine or others.

(Isomerization Method)

In an isomerization reactor 10, the isomerization is carried out by bringing the middle distillate separated in the fractionator 9b into contact with an isomerization catalyst. When the hydrocarbon oil manufactured by the present invention is used as a gas oil fraction base stock, the isomerization may increase the content of a branched hydrocarbon compound and improve low-temperature fluidity as a gas oil fraction base stock. In addition, the disposition of the fractionator 9b and the isomerization reactor 10 is reversed and a hydrocarbon oil obtained after separating hydrogen, hydrogen sulfide, carbon dioxide and water in the separator 6a is isomerized, and then the isomerized oil may be fractionated in the fractionator 9b.

The reaction zones of isomerization may be constituted by a single catalyst bed and may be constituted by a plurality of catalyst beds. In addition, when the reaction zones are constituted by a plurality of catalyst beds, the catalyst beds may be separately installed in a single reactor, or a plurality of reactors are disposed in series or in parallel and the catalyst beds may be installed in each of the reactors.

As the form of the reactor in the reaction zones of isomerization, a fixed bed system may be employed. That is, hydrogen may be supplied by either a counter flow system or a cocurrent flow system for the oil to be treated. In addition, when a plurality of reactors is used, a combination of a counter flow system and a cocurrent flow system may be employed. A cocurrent gas-liquid downflow system may be employed as the general form. Further, the reactors may be used alone or in combination of a plurality of them, and there may be employed a structure in which the inside of a reactor is divided into a plurality of catalyst beds.

The isomerization catalyst is not particularly limited as long as it has hydroisomerization activity, but preferably used is a catalyst which contains a porous inorganic oxide containing two or more elements selected from aluminum, silicon, zirconium, boron, titanium and magnesium and one or more metal elements selected from Group VIII elements of the periodic table supported on the porous inorganic oxide.

As the support of the isomerization catalyst, preferred is two or more elements selected from aluminum, silicon, zirconium, boron, titanium and magnesium, and more preferred is an inorganic oxide (composite oxide of an aluminum oxide and other oxides) containing aluminum and other elements from the viewpoint of being capable of further improving the hydroisomerization activity.

The porous inorganic oxide preferably comprises at least two or more elements among aluminum, silicon, zirconium and titanium. The porous inorganic oxide may be either in an amorphous state or in a crystalline state, and a zeolite may be used. When a zeolite is used, a zeolite having a crystalline structure such as FAU, BEA, MOR, MFI, MEL, MWW, TON, AEL and MTT, among the structure codes specified by the International Zeolite Association is preferably used.

As the metal supported on the isomerization catalyst, preferred is one or more metals selected from elements of Group VIII of the periodic table, among which more preferred are one or more metals selected from Pt, Pd, Ru, Rh, Au, Ir, Ni and Co, and especially preferred are Pt, Rd, Ru and Ni. In addition, these active metals may be used in combination of two or more metals, and examples of such a combination include Pt—Pd, Pt—Ru, Pt—Rh, Pt—Au, and Pt—Ir.

A method for incorporating these active metals into a catalyst is not particularly limited, and a well-known method which is applied when producing a usual hydrotreatment catalyst may be employed. In general, a method of impregnating a solution containing a salt of an active metal into a catalyst support is preferably employed. In addition, an equilibrium adsorption method, a pore-filling method, an incipient-wetness method and the like are preferably employed. For example, the pore-filling method is a method in which the pore volume of a support is measured in advance and then the support is impregnated with the same volume of a metal salt solution. In addition, the impregnation method is not particularly limited, and a support may be impregnated by a suitable method depending on the supported amount of the metal and physical properties of the catalyst support. The metal source such as nitrate and sulfate salts of these metals or complex salt form of these metals are dissolved in an aqueous solution or a suitable organic solvent and the resulting solution is used as an impregnation solution.

In addition, in the inlet of the reaction zone for isomerization, a feedstock oil to be isomerized has a sulfur content of preferably 1 ppm by mass or less and more preferably 0.5 ppm by mass. If the sulfur content exceeds 1 ppm by mass, the progress of the hydroisomeriation in the first step may be prevented. In addition to that, the sulfur content concentration of the reaction gas containing hydrogen introduced together with the feedstock oil to be isomerized is required to be sufficiently low, and the concentration is preferably 1 ppm by volume or less and more preferably 0.5 ppm by volume or less.

The reaction conditions in the isomerization step are preferably a hydrogen pressure of 1 to 10 MPa, a liquid hourly space velocity (LHSV) of 0.1 to 3.0 $h^{-1}$ and a hydrogen oil ratio (hydrogen/oil ratio) of 100 to 1500 NL/L; more preferably a hydrogen pressure of 2 to 8 MPa, a liquid hourly space velocity (LHSV) of 0.2 to 2.5 $h^{-1}$ and a hydrogen oil ratio (hydrogen/oil ratio) of 200 to 1200 NL/L; and much more preferably a hydrogen pressure of 2.5 to 8 MPa, a liquid hourly space velocity (LHSV) of 0.2 to 2.0 $h^{-1}$ and a hydrogen oil ratio (hydrogen/oil ratio) of 250 to 1000 NL/L. All of these conditions are factors having an influence on the reaction activity of the catalyst, for example, if the hydrogen pressure and the hydrogen oil ratio are less than the above lower limits, the reactivity tends to decrease and the catalytic activity tends to rapidly decrease. On the other hand, if the hydrogen pressure and the hydrogen oil ratio exceed the above upper limits, an excessive investment in equipment such as a compressor tends to be required. In addition, the lower the liquid hourly space velocity is, the more advantageous it tends to be for the reaction. However, if the liquid hourly space velocity is less than the above lower limit, a reactor having an extremely large internal volume is required and an excessive investment in equipment tends to be required. On the other hand, if the liquid hourly space velocity exceeds the above upper limits, the reaction does not tend to sufficiently proceed.

The reaction temperature in the isomerization step is in the range of preferably 220 to 390° C., more preferably 240 to 380° C. and especially preferably 250 to 365° C. If the reaction temperature is lower than 220° C., a sufficient hydroisomerization reaction does not proceed, and if the reaction temperature is higher than 390° C., excessive cracking or other side reactions may proceed.

In the isomerization step, generally, the hydrogen gas, which is introduced into the reaction zone together with the feedstock oil to be isomerized, is introduced from the reaction zone inlet together with the feedstock oil on upstream or downstream of the heating furnace for increasing temperature to a predetermined reaction temperature. However, apart from this, the hydrogen gas may be introduced from between the catalyst beds or from between a plurality of reactors for the purpose of controlling the temperature within the reaction zone as well as maintaining the hydrogen pressure over the whole reaction zone (quench hydrogen). Alternatively, a part of any of or plural combinations of a product oil, an unreacted oil, a reaction intermediate oil and the like may be introduced from between the reaction zone inlet and the catalyst bed or from between a plurality of reactors or the like. Thus, an excessive cracking reaction or a runaway reaction caused by an increase in the reaction temperature can be avoided by controlling the reaction temperature.

The product oil after the isomerization may be fractionated into a plurality of fractions in a fractionator, where necessary. For example, the product oil may be fractionated into a light distillate such as a gas and a naphtha fraction, a middle distillate such as kerosene, a jet fraction and a gas oil fraction, and a heavy distillate such as a residue fraction. In this case, the cut temperature between the light distillate and the middle distillate is preferably 100 to 200° C., more preferably 120 to 180° C. and much more preferably 140 to 160° C. In addition, the cut temperature between the middle distillate and the heavy distillate is preferably 300 to 400° C., more preferably 300 to 380° C. and much more preferably 300 to 360° C. Further, hydrogen may be produced by modifying a part of the light hydrocarbon fraction to be produced in a steam reforming apparatus. The hydrogen thus produced has a property which is the so-called carbon neutrality and can reduce the environmental load because the raw materials used for steam reforming are hydrocarbons derived from biomass.

When the isomerization of the hydrocarbon oil is carried out, the product oil obtained in the isomerization step contains a branched hydrocarbon compound. In this case, the content of the branched hydrocarbon compound is preferably 5 to 90%, more preferably 10 to 80% and especially preferably 20 to 60% in weight ratio based on the total amount of the product oil. If the content of the branched hydrocarbon compound is lower than the above lower limit, the effect of improving low-temperature fluidity is low, and if the content of the branched hydrocarbon compound is higher than the above upper limit, the desired yield of the gas oil fraction is decreased.

The hydrocarbon oil manufactured by the present invention and its isomerized oil may be suitably used especially as a diesel gas oil, an aviation fuel base stock or a heavy oil base stock. The hydrocarbon oil according to the present invention may be used alone as a diesel gas oil, an aviation fuel base stock or a heavy oil base stock, but can be used as a diesel gas oil, an aviation fuel base stock or a heavy oil base stock with which components such as other base stocks are mixed. As the other base stocks, there may be mixed a gas oil fraction and/or a kerosene fraction obtained in a common petroleum refining step and a residue fraction obtained by the manufacturing method of the present invention. Further, there may be mixed a synthetic gas oil or a synthetic kerosene, which is obtained through the Fisher-Tropsch reaction and the like using a so-called synthetic gas comprising hydrogen and carbon monoxide as a raw material. The synthetic gas oil or synthetic kerosene is characterized in that it contains almost no aromatic content, mainly consists of saturated hydrocarbons and has a high cetane number. In addition, the method for manufacturing the synthetic gas is not particularly limited and a well-known method may be employed.

The residue fraction obtained by the manufacturing method of the present invention has a sulfur content of 0.1% by mass or less and an oxygen content of 1% by mass or less, and may be used as a low-sulfur heavy base stock. In addition, the residue fraction is preferable as a feedstock oil for catalytic cracking. In this manner, the residue fraction having a low sulfur content is supplied to a catalytic cracking apparatus, thereby enabling production of a gasoline base stock or other fuel oil base stocks having a low sulfur content. Further, the residue fraction may be used as a feedstock oil for hydrocracking. If such a residue fraction is supplied to a hydrocracking apparatus, the cracking activity may be improved or the high quality of the properties of each fraction of the product oil may be attained.

EXAMPLES

Hereinafter, the present invention will be further specifically described based on Examples and Comparative Examples, but the present invention is not limited to the following Examples.

(Preparation of Catalyst)

<Catalyst A>

A mixture was prepared by adding 18.0 g of sodium silicate solution No. 3 to 3000 g of an aqueous solution of 5% by mass of sodium aluminate, and the mixture was placed in a vessel kept at a temperature of 65° C. On the other hand, in a separate vessel kept at a temperature of 65° C., a solution was prepared by adding 6.0 g of phosphoric acid (concentration: 85%) to 3000 g of an aqueous solution of 2.5% by mass of aluminum sulfate, and to the resulting solution was added dropwise the solution containing sodium aluminate. The addition of the solution was stopped when the mixture solution reached pH 7.0. The resulting slurry product was filtered out to obtain a cake slurry.

The cake slurry was transferred in a vessel equipped with a reflux condenser and to the vessel were added 150 ml of distilled water and 10 g of a 27% ammonia aqueous solution. The mixture was then heated and stirred at 75° C. for 20 hours. The slurry was placed in a kneader and kneaded while heating at 80° C. or higher to remove moisture, thereby obtaining a clay-like kneaded product. The resulting kneaded product was extruded by an extruder into a cylindrical shape having a diameter of 1.5 mm. The resulting cylindrical product was dried at 110° C. for one hour and then calcined at 550° C. to obtain a molded support.

Into an eggplant-type flask were placed 50 g of the resulting molded support and then injected an impregnation solution containing 17.3 g of molybdenum trioxide, 13.2 g of cobalt (II) nitrate hexahydrate, 3.9 g of phosphoric acid (concentration: 85%) and 4.0 g of malic acid while deaerating with a rotary evaporator. The impregnated sample was dried at 120° C. for 1 hour and then calcined at 550° C. to obtain Catalyst A. The physical properties of Catalyst A prepared are sown in Table 1.

<Catalyst B>

Into an eggplant-type flask were placed 50 g of a commercially available silica-alumina catalyst support (N6321HN, produced by Nikki Chemical Co., Ltd.) and then injected an aqueous solution of tetra-ammine platinum (II) chloride while deaerating with a rotary evaporator. The impregnated sample was dried at 110° C. and then calcined at 350° C. to obtain Catalyst B. The supported amount of platinum in Catalyst B was 0.5% by mass based on the total amount of the catalyst.

TABLE 1

|  | Catalyst A | Catalyst B |
|---|---|---|
| $Al_2O_3$ content (% by mass, based on mass of support) | 91.2 | 100 |
| $SiO_2$ content (% by mass, based on mass of support) | 4.8 | 0 |
| $P_2O_5$ content (% by mass, based on mass of support) | 4.0 | 0 |
| $MoO_3$ content (% by mass, based on mass of catalyst) | 24.0 | 0 |
| NiO content (% by mass, based on mass of catalyst) | 2.6 | 0 |
| $P_2O_5$ content (% by mass, based on mass of catalyst) | 4.0 | 0.5 |
| Pore volume (ml/g) | 0.75 | 0.47 |
| Average pore diameter (nm) | 7.0 | 5.2 |
| Ratio of pore volume derived from pores with a pore diameter of 3 nm or less based on the total pore volume (nm) | 22 | 39 |

Example 1

Three reaction tubes (having an inner diameter of 20 mm) filled with Catalyst A (100 ml) were fitted in a fixed-bed flow reactor in a countercurrent fashion. Thereafter, the presulfiding of the catalyst was carried out for 4 hours under the conditions of an average temperature of the catalyst layer of 300° C., a hydrogen pressure of 6 MPa, a liquid hourly space velocity of 1 h$^{-1}$ and a hydrogen/oil ratio of 200 NL/L using a straight run gas oil (sulfur content: 3% by mass) with dimethylsulfide.

After the presulfiding, a part of the middle distillate of fractionated in the fractionator described later was recycled to palm oil (the ratio of a compound having a triglyceride structure to an oxygen-containing hydrocarbon compound: 98% by mole) having the properties shown in Table 2 in an amount of 1-fold by mass based on the palm oil (feedstock oil), and then the oil to be treated was prepared by adding dimethylsulfide so that the sulfur content (in terms of the sulfur atom) is 10 ppm by mass based on the palm oil. Then, hydrorefining was carried out using the oil to be treated. The oil to be treated had a density at 15° C. of 0.916 g/ml and an oxygen content of 11.4% by mass. In addition, the hydrorefining conditions were set at a first reaction tube inlet temperature ($t_1$) of 180° C., a hydrogen pressure of 6 MPa, a liquid hourly space velocity of 0.5 h$^{-1}$ and a hydrogen/oil ratio of 500 NL/L. In addition, a part of the middle distillate, which was fractionated in the fractionator so that the inlet temperatures of the second reaction tube and the third reaction tube are $t_2$=190° C. and $t_3$=230° C., respectively, was introduced as quench. The treated oil after the hydrorefining was introduced into the high-pressure separator to remove hydrogen, hydrogen sulfide, carbon dioxide and water from the treated oil. The effluent after the introduction of the high-pressure separator was introduced into the fractionator and fractionated into a light distillate having a boiling point of less than 150° C., a middle distillate having a boiling point of 150 to 350° C. and a heavy distillate having a boiling point higher than 350° C. A part of the middle distillate was cooled with cooling water to 40° C. and recycled to the palm oil which is a feedstock oil as described above, and the residue was collected as a gas oil base stock. The hydrorefining conditions are shown in Table 3, and the temperature difference ($\Delta T_n$) between each reaction tube outlet and inlet, the inlet temperature ($t_n$) and outlet temperature ($T_n$) of each reaction tube and the resulting results are shown in Table 4. In addition, in Table 4 and Table 6, the term "C15 to C18 quantity in the hydrocarbon oil after the separator" shows the ratio of the hydrocarbon compound having 15 to 18 carbon atoms (middle distillate) in the effluent after the hydrorefining as a relative value assuming that the value in Example 1 is 100. If the value becomes smaller, it means that the yield of the middle distillate is poor and excessive cracking proceeds in the hydrorefining. Further, if the value of $\Delta T_n$ is larger, it means that heat generation is large in the hydrorefining treatment.

Example 2

The hydrorefining was carried out in the same manner as in Example 1 except that the hydrogen pressure was set at 3 MPa. The hydrorefining conditions are shown in Table 3 and the resulting results are shown in Table 4.

Example 3

The hydrorefining was carried out in the same manner as in Example 1 except that a part of the treated oil from which by-products are removed with the high-pressure separator was cooled with cooling water to 40° C. and then recycled in an amount of 1-fold by mass based on the palm oil, instead of recycling the middle distillate after fractionation. The hydrorefining conditions are shown in Table 3 and the resulting results are shown in Table 4.

Example 4

The fourth reaction tube (having an inner diameter of 20 mm) filled with Catalyst B (150 mL) was connected to the subsequent stage of the fixed bed flow reactor in Example 1. For Catalyst B, reducing treatment was carried out under the conditions of an average temperature of the catalyst layer of 320° C., a hydrogen pressure of 5 MPa and a hydrogen gas flow rate of 83 ml/min for 6 hours.

The step until obtaining a middle distillate was carried out in the same manner as in Example 1, and the residual fraction recycled was introduced into the fourth reaction tube (having an inner diameter of 20 mm) filled with Catalyst B (150 mL) and subjected to isomerization. Firstly, for Catalyst B, reduction treatment was carried out under the conditions of an average temperature of the catalyst layer of 320° C., a hydrogen pressure of 5 MPa and a hydrogen gas flow rate of 83 ml/min for 6 hours. Subsequently, isomerization was carried out under the conditions of an average temperature of the catalyst layer of 330° C., a hydrogen pressure of 3 MPa, a liquid hourly space velocity of 1 and a hydrogen/oil ratio of 500 NL/L. The oil after the isomerization was further introduced into the second fractionator and fractioned into a light distillate having a boiling point less than 150° C., a middle distillate having a boiling point of 150 to 350° C. and a heavy distillate having a boiling point exceeding 350° C. The second middle distillate is used for a gas oil base stock. The hydrorefining conditions are shown in Table 3 and the resulting results are shown in Table 4.

Comparative Example 1

The hydrorefining was carried out in the same manner as in Example 1 except that the first reaction tube inlet temperature ($t_1$) was set at 200° C. and a part of the treated oil from which by-products were removed with the high-pressure separator was not quenched between the reactors. The hydrorefining conditions are shown in Table 5 and the resulting results are shown in Table 6.

Comparative Example 2

The hydrorefining was carried out in the same manner as in Example 1 except that dimethylsulfide was not added to palm oil. The hydrorefining conditions are shown in Table 5 and the resulting results are shown in Table 6. Here, when comparing catalyst lives assuming that the catalyst life of Example 1 is 100, the catalyst life of Comparative Example 2 was 80 and shortening of catalyst life was observed due to no addition of a sulfur-containing hydrocarbon compound. The term "catalyst life" as used here is defined as the time until the hydrocarbon quantity of C15 to C18 in a hydrocarbon oil is decreased to 90 assuming that the initial state of Example 1 is 100.

Comparative Example 3

The hydrorefining was carried out in the same manner as in Example 1 except that the inlet temperature ($t_3$) of the third reaction tube was set at 210° C. by adjusting the amount of quench and the hydrogen pressure was set at 11 MPa. The hydrorefining conditions are shown in Table 5 and the results obtained until the experiment was stopped are shown in Table 6.

The experiment was stopped because the effluent was colored when 1000 hours elapsed from the start of the reaction. The pipe (material: SUS 316) at the downstream of the reaction tube was inspected in detail and as a result, corrosion was confirmed.

Comparative Example 4

The hydrorefining was carried out in the same manner as in Example 1 except that a part of the treated oil from which by-products were removed with the high-pressure separator was not recycled to palm oil. The hydrorefining conditions are shown in Table 5 and the resulting results are shown in Table 6.

Comparative Example 5

The hydrorefining was carried out in the same manner as in Example 1 except that the recycling of the middle distillate was set at 7-fold by mass based on palm oil and a part of the treated oil from which by-products were removed with the high-pressure separator was not quenched between the reactors. The product oil contained unreacted raw materials and the hydrodeoxygenation reaction did not sufficiently proceed. The hydrorefining conditions are shown in Table 5 and the resulting results are shown in Table 6.

TABLE 2

|  |  | Vegetable oil and fat (Palm oil) |
|---|---|---|
| Density at 15° C. (kg/m$^3$) |  | 916 |
| Kinetic viscosity at 30° C. (mm$^2$/s) |  | — |
| Elemental analysis | C (% by mass) | 77.3 |
|  | H (% by mass) | 12.0 |
| Nitrogen content (ppm by mass) |  | 10.6 |
| Sulfur content (% by mass) |  | <1 |
| Acid value (mg KOH/g) |  | 0.07 |
| Component ratio of fatty acid group in oil and fat (% by mass) | Butyric acid group | 0 |
|  | Caproic acid group | 0 |
|  | Caprylic acid group | 0 |
|  | Capric acid group | 0 |
|  | Laurie acid group | 0 |
|  | Myristic acid group | 1 |
|  | Palmitic acid group | 44 |
|  | Stearic acid group | 5 |
|  | Oleic acid group | 39 |
|  | Linoleic acid group | 10 |
|  | Linolenic acid group | 0 |

TABLE 3

|  |  | Example 1 | Example 2 | Example 3 | Example 4 |
|---|---|---|---|---|---|
| Recycled amount (Based on palm oil) | Fold by mass | 1 | 1 | 1 | 1 |
| Hydrogen pressure | MPa | 6 | 3 | 6 | 6 |
| LHSV | h$^{-1}$ | 1.0 | 1.0 | 1.0 | 1.0 |
| With or without quench |  | With | With | With | With |
| Addition amount of sulfur-containing hydrocarbon compound (With respect to palm oil) | ppm by mass | 10 | 10 | 10 | 10 |

TABLE 4

|  |  | Example 1 | Example 2 | Example 3 | Example 4 |
|---|---|---|---|---|---|
| $\Delta T_1$ of first reaction tube | ° C. | 37 | 35 | 37 | 37 |
| $\Delta T_2$ of second reaction tube | ° C. | 53 | 52 | 53 | 53 |
| $\Delta T_3$ of third reaction tube | ° C. | 73 | 71 | 73 | 73 |
| Total temperature increase amount ($\Sigma\Delta T_n$) | ° C. | 163 | 158 | 163 | 163 |
| Inlet temperature of first reaction tube ($t_1$) | ° C. | 180 | 180 | 180 | 180 |
| Inlet temperature of second reaction tube ($t_2$) | ° C. | 190 | 190 | 190 | 190 |
| Inlet temperature of third reaction tube ($t_3$) | ° C. | 230 | 230 | 230 | 230 |
| Outlet temperature of first reaction tube ($T_1$) | ° C. | 217 | 215 | 217 | 217 |
| Outlet temperature of second reaction tube ($T_2$) | ° C. | 243 | 242 | 243 | 243 |
| Outlet temperature of third reaction tube ($T_3 = T_{last}$) | ° C. | 303 | 301 | 303 | 303 |
| Condensation temperature of water below outlet of first reaction tube | ° C. | 189 | 160 | 189 | 189 |
| Sulfur concentration in hydrocarbon oil | ppm by mass | <1 | <1 | <1 | <1 |
| C15 to C18 quantity in hydrocarbon oil after separator | % by mass | 100 | 100 | 100 | 100 |

TABLE 5

|  |  | Comparative Example 1 | Comparative Example 2 | Comparative Example 3 | Comparative Example 4 | Comparative Example 5 |
|---|---|---|---|---|---|---|
| Recycled amount (With respect to palm oil) | Fold by mass | 1 | 1 | 1 | 0 | 7 |
| Hydrogen pressure | MPa | 6 | 6 | 11 | 6 | 6 |
| LHSV | $h^{-1}$ | 1.0 | 1.0 | 1.0 | 1.0 | 1.0 |
| With or without quench |  | Without | With | With | With | Without |
| Addition amount of sulfur-containing hydrocarbon compound (With respect to palm oil) | ppm by mass | 10 | 0 | 10 | 10 | 10 |

TABLE 6

|  |  | Comparative Example 1 | Comparative Example 2 | Comparative Example 3 | Comparative Example 4 | Comparative Example 5 |
|---|---|---|---|---|---|---|
| $\Delta T_1$ of first reaction tube | °C. | 37 | 37 | 39 | 70 | 9 |
| $\Delta T_2$ of second reaction tube | °C. | 53 | 53 | 56 | 104 | 13 |
| $\Delta T_3$ of third reaction tube | °C. | 73 | 73 | 53 | 142 | 18 |
| Total temperature increase amount ($\Sigma \Delta T_n$) | °C. | 163 | 163 | 148 | 316 | 40 |
| Inlet temperature of first reaction tube ($t_1$) | °C. | 200 | 180 | 180 | 180 | 180 |
| Inlet temperature of second reaction tube ($t_2$) | °C. | 237 | 190 | 190 | 190 | 189 |
| Inlet temperature of third reaction tube ($t_3$) | °C. | 290 | 230 | 210 | 230 | 202 |
| Outlet temperature of first reaction tube ($T_1$) | °C. | 237 | 217 | 219 | 250 | 189 |
| Outlet temperature of second reaction tube ($T_2$) | °C. | 290 | 243 | 246 | 294 | 202 |
| Outlet temperature of third reaction tube ($T_3 = T_{last}$) | °C. | 363 | 303 | 263 | 372 | 220 |
| Condensation temperature of water below outlet of first reaction tube | °C. | 189 | 189 | 218 | 189 | 112 |
| Sulfur concentration in hydrocarbon oil | ppm by mass | <1 | <1 | <1 | <1 | — |
| C15 to C18 quantity in hydrocarbon oil after separator | % by mass | 96 | 100 | 99 | 92 | 24 |

As shown in the above Table 4, according to Examples 1 to 4, there may be realized a hydrorefining method of a feedstock oil in which the reaction heat can be suppressed and the condensation of by-product water can be prevented by controlling the hydrogen pressure, the recycled amount, the inlet and outlet temperatures of the reaction zones in a suitable range, and the desired middle distillate is obtained in high yield.

1 pretreatment apparatus; 2 pump; 3 heat exchanger; 4 heater; 5 hydrotreatment reactor; 6a, 6b separator; 7 PSA gas separator apparatus; 8a, 8b, 8c reaction zone; 9a, 9b fractionator; 10 isomerization reactor.

The invention claimed is:
1. A method for manufacturing a hydrocarbon oil, comprising:
a first step wherein a plurality of reaction zones filled with a catalyst which contains a porous inorganic oxide comprising two or more elements selected from aluminum, silicon, zirconium, boron, titanium and magnesium and one or more metals selected from Group 6A and Group 8 elements of the periodic table supported on the porous inorganic oxide is disposed in series and a feedstock oil containing an oxygen-containing hydrocarbon compound derived from an animal or vegetable oil is supplied and hydrotreated under the conditions of a hydro- gen pressure of 1 MPa or more and less than 10 MPa in each of the reaction zones, and a ratio of hydrogen to oil (hydrogen/oil ratio) in the range of 100 to 1500 NL/L; and a second step wherein hydrogen, hydrogen sulfide, carbon dioxide and water are removed from a product to be treated obtained in the first step to obtain a hydrocarbon oil, wherein, among the plurality of reaction zones, the inlet temperature of the reaction zone disposed on the most upstream side is 150° C. or more and 250° C. or less, the inlet temperature of the second most upstream reaction zone or below is equal to or higher than the condensation temperature of water, the outlet temperature of the reaction zone disposed on the most downstream side is 260° C. or more and 360° C. or less, wherein if the number of the reaction zones in the first step is represented by n, where n is an integer of 2 or more, and the inlet temperature and the outlet temperature of the $k^{th}$ reaction zone from the most upstream side are resented respectively by $t_k$ and $T_k$ where k is an integer of 2 to n, the relation between the partial pressure PW (in MPa) of the water produced as a by-product and the temperature $t_k$ (in ° C.) at that time satisfies the conditions represented b the following formula:

$$PW < 6.11 \times 10^{\{7.5 \times t_k \div (t_k + 237.3)\}} \times 10^{-4},$$

and wherein the feedstock oil contains: a recycled oil in which a part of the hydrocarbon oil obtained in the second step is recycled and supplied in an amount of 0.5- to 5-fold by mass to the oxygen-containing hydrocarbon compound contained in the feedstock oil; and 1 to 50 ppm by mass of a sulfur-containing hydrocarbon compound in terms of the sulfur atom to the oxygen-containing hydrocarbon compound contained in the feedstock oil, wherein the sulfur-containing hydrocarbon compound is at least one selected from a sulfide, a disulfide, a polysulfide, a thiol, a thiophene, a benzothiophene, a dibenzothiophene, and a derivative thereof.

2. The method for manufacturing a hydrocarbon oil according to claim 1, wherein in each of the plurality of reaction zones, the difference between the outlet temperature and the inlet temperature is 80° C. or less and the sum of the difference between the outlet temperature and the inlet temperature in each of the reaction zones is 200° C. or less.

3. The method for manufacturing a hydrocarbon oil according to claim 1, wherein a part of the hydrocarbon oil is supplied as a quench oil between the adjacent reaction zones among the plurality of the reaction zones and thereby the inlet temperature of the reaction zone disposed on the downstream side of the supplying position of the quench oil is controlled.

4. The method for manufacturing a hydrocarbon oil according to claim 3, wherein the recycled oil and/or the quench oil contain a part of a product obtained by isomerizing the hydrocarbon oil or a middle distillate fractioned from the hydrocarbon oil.

5. The method for manufacturing a hydrocarbon oil according to claim 1, wherein the hydrocarbon oil is fractionated into a light distillate, a middle distillate and a heavy distillate, and the cut temperature between the light distillate and the middle distillate is set at 100 to 200° C. and the cut temperature between the middle distillate and the heavy distillate is set at 300 to 400° C.

6. The method for manufacturing a hydrocarbon oil according to claim 1, further comprising a third step wherein the hydrocarbon oil or a middle distillate fractionated from the hydrocarbon oil is isomerized.

7. The method for manufacturing a hydrocarbon oil according to claim 6, wherein an isomerized oil obtained in the third step is fractionated into a light distillate, a middle distillate and a heavy distillate, the cut temperature between the light distillate and the middle distillate is set at 100 to 200° C. and the cut temperature between the middle distillate and the heavy distillate is set at 300 to 400° C.

8. The method for manufacturing a hydrocarbon oil according to claim 1, wherein the oxygen-containing hydrocarbon compound is one or more compounds selected from a fatty acid and a fatty acid ester.

9. The method for manufacturing a hydrocarbon oil according to claim 1, wherein the catalyst has a pore volume of 0.30 to 0.85 ml/g as measured by a nitrogen adsorption BET method and an average pore diameter of 5 to 11 nm, and the ratio of the pore volume derived from pores having a pore diameter of 3 nm or less to the total pore volume is 35% by volume or less.

10. The method for manufacturing a hydrocarbon oil according to claim 1, wherein the porous inorganic oxide contains the element phosphorus.

* * * * *